Figure 1:
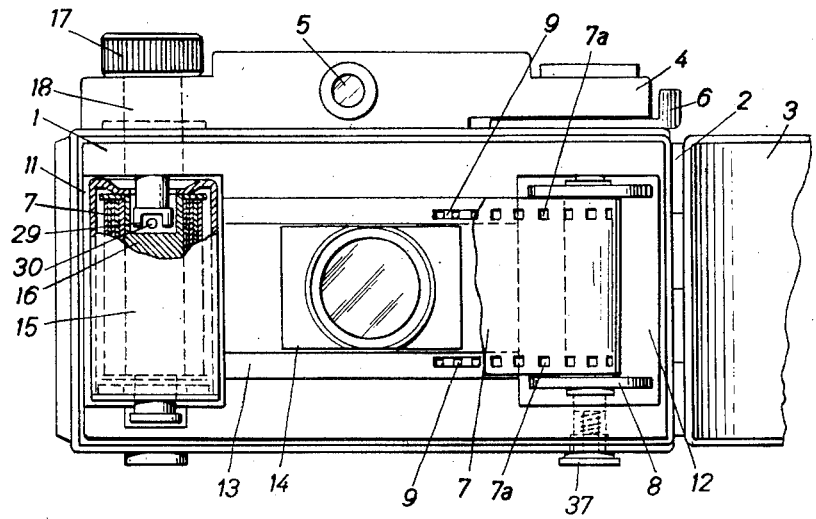

Dec. 23, 1952  L. GOLDHAMMER  2,622,819
REWINDING DEVICE FOR PHOTOGRAPHIC ROLL FILM CAMERAS
Filed March 22, 1950  2 SHEETS—SHEET 1

Leo Goldhammer  Inventor

By *Connolly and Hutz* Attorneys

Dec. 23, 1952     L. GOLDHAMMER     2,622,819
REWINDING DEVICE FOR PHOTOGRAPHIC ROLL FILM CAMERAS
Filed March 22, 1950     2 SHEETS—SHEET 2
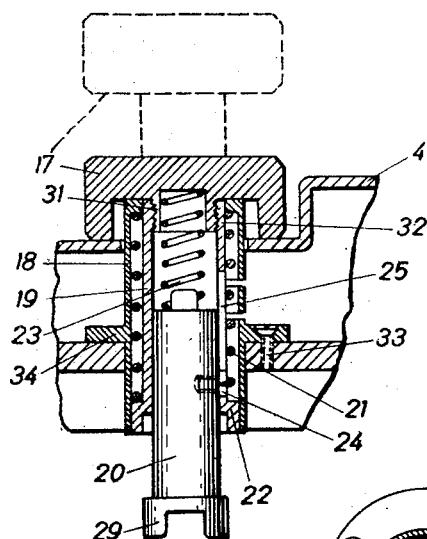
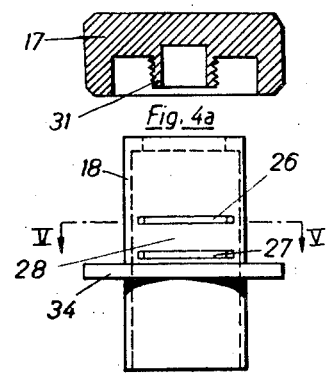
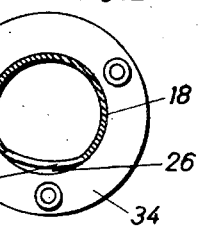
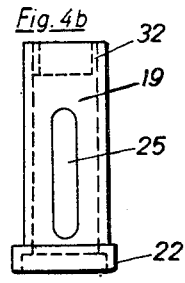
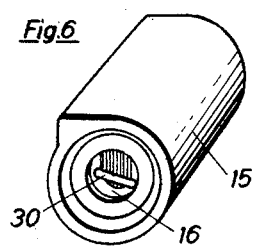
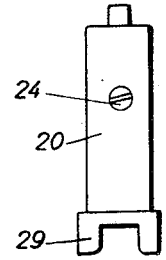
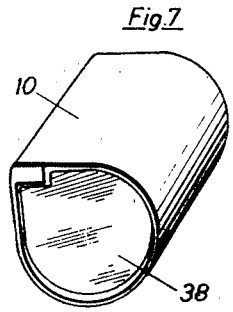
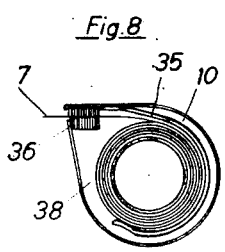
Leo Goldhammer *Inventor*
By Connolly and Hutz *Attorneys*

Patented Dec. 23, 1952

2,622,819

UNITED STATES PATENT OFFICE 2,622,819

REWINDING DEVICE FOR PHOTOGRAPHIC ROLL FILM CAMERAS

Leo Goldhammer, Munich, Germany

Application March 22, 1950, Serial No. 151,156
In Germany December 22, 1948

11 Claims. (Cl. 242—71)

This invention relates to improvements in rewinding devices for roll film cameras of the type normally employing a supply spool, onto which a standard cinematographic film is wound, which after exposure in sections is wound on a take-up spool, whereupon the completely exposed film is wound back again onto the supply spool with a rewinding key.

In cameras of this type a known device has been provided, which allows of the section-by-section rotation of the take-up spool with a turning knob or by means of a winding handle and then the winding back again of the film in the opposite direction onto the supply spool.

Roll film cameras of a similar type are also already known in which film cassettes without spools are employed as the take-up device and supply means. In this case the film is advanced by means of feed-sprocket wheels into an empty cassette which is positioned in the roll film camera in the place of the take-up spool. When using this type of cassette as the supply means, it is not possible to wind back the exposed film.

It is an object of the present invention to provide the photographic roll film camera with a rewinding device which greatly facilitates changing of the film supply means and renders possible the utilization of film cassettes without spools in the same photographic apparatus that may employ a supply spool on which the exposed film is rewound.

Another object of the invention consists in a rewinding device the constituent parts of which can be simply constructed and easily assembled in the camera casing.

A further object of the invention includes means for holding the rewinding key in a simple manner in both the operative (spool engaging) and non-operative positions.

A further advantage of the invention consists in that, when employing cassettes containing no spools, after pressing in the rewinding key, it does not project to any considerable extent inside the camera casing.

The rewinding device of the present invention comprises a key member which is telescopically mounted in a winding member and may suitably be maintained in the spool engaging position by means of a compression spring.

More particularly such a rewinding device comprises a sleeve member in which is located a winding tube combined with an external winding head, such as a threaded knob, to form an integral winding unit, said tube having within it a key member, with one compression spring between the sleeve member and the winding tube and a second compression spring between the winding member and the key member. The winding tube may have a longitudinal slot and the key member a projection, such as a screw, engaging in said slot, whereby the key member is rendered non-rotatable with respect to the winding tube while remaining axially displaceable therein.

The cylindrical wall of the sleeve member may be deformed to produce an internally projecting plate spring adapted for temporary clamping engagement with the winding tube, when the latter is withdrawn for replacement of the film spool or spool-less cassette.

Figure 2:
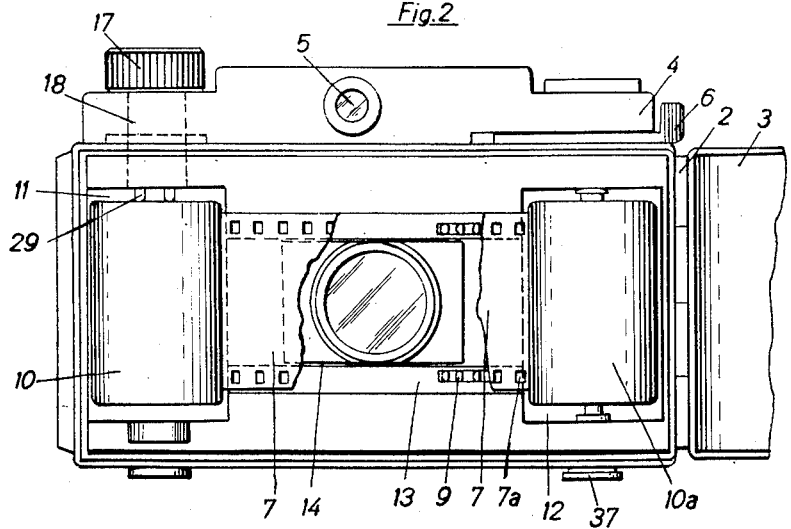

The invention is illustrated by way of example in the accompanying drawings in which:

Fig. 1 is a rear elevation of a camera with an open back and with a spool-containing cassette in place as the supply means, shown partly in section, Fig. 2 is a similar rear elevation of the camera containing cassettes without spools as the take-up and supply means, Fig. 3 is an axial section on an enlarged scale of a rewinding device according to the invention mounted in the camera casing in the operative (spool engaging) position, Figs. 4, 4a, 4b, 4c are an elevation showing the main component parts of the rewinding device in disassembled condition and also on an enlarged scale, the winding knob being shown in axial section, Fig. 5 is a section on the line V—V of Fig. 4a of the sleeve member, on an enlarged scale, Fig. 6 is a perspective view of a film supply spool in a light-tight container, Fig. 7 is a perspective view of a film cassette with no spool, and Fig. 8 is an end elevation of an opened spool-less film cassette of the type shown in Fig. 7.

Referring to Fig. 1, the camera consists of a camera body 1 to which is joined by a hinge 2 the back cover 3. On the top wall of the camera body 1 is located a housing 4 in which may be arranged and enclosed the component parts of a range-finder with a viewing window 5. In the housing 4 is likewise accommodated a known film feed mechanism which may be operated by the feeding handle 6 to advance the film 7 by a predetermined length (36 mm.) after each exposure. At the back of the camera body 1 are located two spool chambers 11 and 12, and a film guide 13 with a picture opening 14. As illustrated in Fig. 1, the spool chamber 11 accommodates a light-tight container 15 of known type, which contains a supply spool 16 on which the film 7 is wound. The film passes through a light-tight exit slot from the container 15 over the guide 13 and is attached by its end to the core of the take-up spool 8. The take-up spool 8 may remain permanently in the camera, because the film after exposure is always wound back again onto the supply spool 16. There serves for this purpose the rewinding device which is operated by the winding knob 17 and which is the main feature of the invention. In Fig. 2 the spool-less cassettes are represented by the reference numerals 10 and 10a. Their functions and details of their construction will be hereinafter described.

The rewinding device is illustrated in Fig. 3. It includes a sleeve member 18, a winding tube 19 and a film key 20. A winding knob 17 is screwed on the tube 19. Between the sleeve member 18 and the winding tube 19 is located a spiral spring 21 which bears on the abutting portion 22 of the tube 19 and by this means holds the latter in the normal position shown. Within the tube 19 is located a spiral spring 23 which bears upon the upper end of the spool key 20, in order to hold the latter in the projecting, operative position shown. By means of a screw 24 fixed in the spool key 20 and the head of which engages in a slot 25 in the tube 19, a connection between the spool key 20 and the tube 19 is established, which transmits a rotation from the winding knob 17 by way of the tube 19 to the film key 20, but also permits an axial displacement of the spool key 20. Furthermore, on the sleeve 18 (see Figs. 4 and 5) by cutting of two slots 26, 27 a plate spring 28 is formed from the material of the sleeve 18, which spring is inwardly bowed to some extent, in order in the withdrawn position of the rewinding device to hold the latter in the non-operative position by clamping pressure upon the abutting portion 22 of the tube 19. In this withdrawn position (shown in part in dotted lines in Fig. 3) the coupling means 29 between the film key 20 and the supply spool 16 are brought out of engagement, whereupon the film container 15 can be replaced by another one or by a spool-less cassette. The coupling means consists of a fork 29 which may straddle a bar 30 on the supply spool 16. When exerting axial pressure on the winding knob 17, the clamping engagement between the plate spring 28 and the abutting portion 22 of the tube 19 is broken, whereupon under the influence of the two spiral springs 21 and 23 the rewinding device is brought back again and held in the operative (spool-engaging) position. While advancing the film during exposure, the rewinding device turns idly and, when the film is completely exposed, the film is rewound upon the supply spool 16 by rotation of the winding knob 17 in the opposite direction.

A great advantage of the invention consists in that the new construction permits a simple and rapid assembly of the rewinding device in the following manner: The film key 20 is inserted in the tube 19 and united therewith by means of the screw 24 which passes through the slot 25. The spiral spring 21 is then slipped over the tube 19, and all these parts 19, 20 and 21 are introduced into the sleeve 18. After the spiral spring 23 has also been introduced into the tube 19, the winding knob 17 is screwed by means of the threads 31 and 32 tightly onto the tube 19. Thereupon the whole rewinding device can be attached to the camera body 1 by means of the screw 33 which passes through the flange 34 of the sleeve 18.

The invention has the further advantage that in the same photographic camera film cassettes of another type having no spools can be used, the film being advanced by the film feed mechanism, in which case the film coils on itself in the take-up cassette. In Figs. 7 and 8 a film cassette 10 of this type is illustrated. Fig. 8 shows the interior of the cassette having no spool. When using this as the take-up means, the film is advanced into the cassette through a light-tight slot 36 covered with velvet by means of feed sprocket wheels 9, and by guide springs 35 the entering film is so guided in the interior of the film cassette 10 that it forms a spiral by coiling upon itself. In order to change to this type of cassette, one first withdraws the spring-loaded spool holder 37, removes the take-up spool 8 from the spool chamber 12 and then introduces in its place the empty cassette 10a.

Since in these spool-less cassettes the end walls 38 are flush, the fork 29 of the film key 20 cannot penetrate into the interior of the cassette 10 and would accordingly, were it not for the construction of this invention, project in an inconvenient manner beyond the housing 4. In order to avoid this disadvantage, the film key 20 is telescopically guided into the tube 19. Consequently, when due to the insertion of a spool-less cassette in the camera the fork 29 comes into contact with the flush end wall 38, the film key 20 need not be removed, since the spring connection with the tube 19 permits an axial displacement of the key with respect to the remainder of the rewinding device. By this means the result is achieved that in the employment of such spool-less cassettes the winding knob 17 does not project substantially beyond the housing of the camera, which would be inconvenient in the handling of the camera.

What is claimed is:

1. In a roll film camera, a film rewinding device extending through the casing of the camera, said rewinding device comprising a winding tube passing through the casing rotatable and axially displaceable with respect thereto, a key member axially displaceable within the winding tube with means to prevent relative rotary motion, resilient means urging the winding tube toward the interior of the camera, and independent resilient means between the winding tube and the key member urging the latter toward the interior of the camera.

2. In a roll film camera, a film rewinding device extending through the casing of the camera, said rewinding device comprising a sleeve member passing through the casing, and firmly attached thereto, a winding tube rotatable and axially displaceable within the sleeve member, a winding knob firmly attached to the outer end of the winding tube, a key member axially displaceable within the winding tube with means to prevent relative rotary motion, resilient means between the sleeve member and the winding tube urging the latter toward the interior of the camera, and independent resilient means between the winding tube and the key member urging the latter toward the interior of the camera.

3. A camera as claimed in claim 2 wherein the winding knob limits the inward movement of the winding tube, and the means to prevent relative rotary motion between the winding tube and key member serves to limit the inward movement of the latter.

4. A camera as claimed in claim 2 wherein each of the resilient means is a spiral spring, and wherein clamping means are provided to hold the winding tube partially outside the camera against the action of the first spiral spring.

5. A camera as claimed in claim 2 wherein the sleeve member is provided with integral means for clamping the winding tube partially outside the camera, and the lower end of the key member is provided with coupling means for engaging a film spool.

6. A film rewinding device comprising an outer sleeve member, a winding tube rotatable and axially displaceable therein, a key member axially displaceable within the winding tube with means to prevent relative rotary motion, resilient means between the sleeve member and the winding tube, and independent resilient means between the winding tube and the key member, each such resilient means tending axially to displace the members upon which it acts.

7. A film rewinding device comprising an outer, cylindrical sleeve member, a winding tube rotatable and axially displaceable therein, a spiral spring between the sleeve member and the winding tube, a key member axially displaceable within the winding tube with means to prevent relative rotary motion, another spiral spring between the winding tube and the key member, and clamping means for holding the winding tube extended partially outside the sleeve member against the action of the first spiral spring.

8. A film rewinding device as claimed in claim 7, wherein a winding knob is firmly attached to one end of the winding tube and limits the axial displacement of the winding tube with respect to the sleeve member in the direction urged by the first spiral spring.

9. A film rewinding device as claimed in claim 7 wherein the means to prevent relative rotary motion between the winding tube and the key member serves to limit the axial displacement of the key member in the direction urged by the second spiral spring.

10. A film rewinding device as claimed in claim 7, wherein a slot in the winding tube and a projection on the key member engaging said slot serves to render the key member non rotatable with respect to the winding tube.

11. A film rewinding device as claimed in claim 7, wherein a slot in the winding tube and a screw on the key member engaging said slot serves to render the key member non rotatable with respect to the winding tube.

LEO GOLDHAMMER.

REFERENCES CITED

The following references are of record in the file of this patent:

UNITED STATES PATENTS

| Number | Name | Date |
| --- | --- | --- |
| 700,264 | Trumbull | May 20, 1902 |
| 1,133,128 | Goddard | Mar. 23, 1915 |
| 2,245,214 | Mihalyi | June 10, 1941 |

FOREIGN PATENTS

| Number | Country | Date |
| --- | --- | --- |
| 383,911 | Great Britain | Nov. 24, 1932 |
| 516,507 | Germany | Jan. 24, 1931 |